United States Patent Office

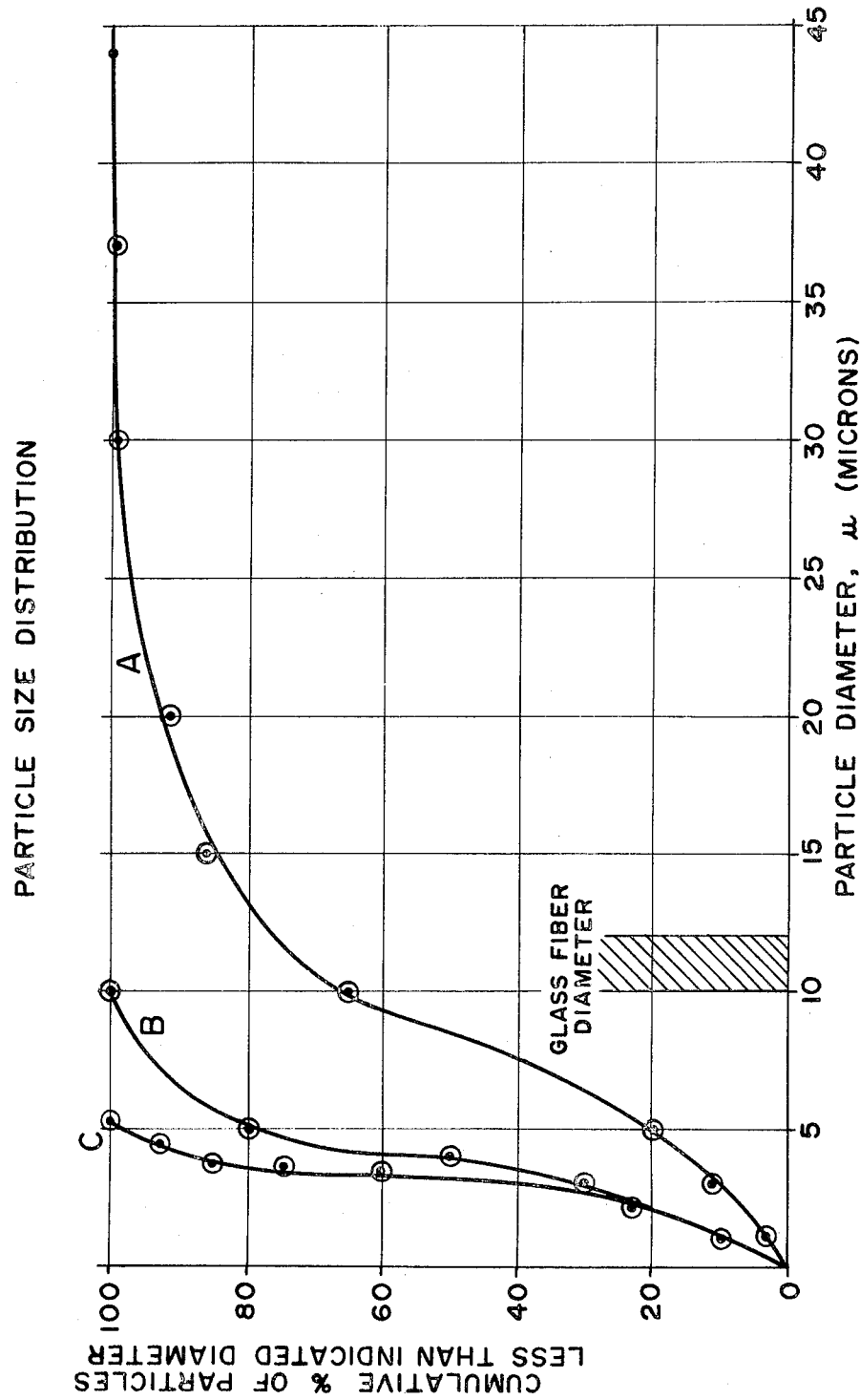

3,740,371
Patented June 19, 1973

3,740,371
POLYETHYLENE TEREPHTHALATE INJECTION MOLDING COMPOSITION CONTAINING NOVACULITE
Leon Segal, Morristown, N.J., assignor to Allied Chemical Corporation, New York, N.Y.
Filed Nov. 26, 1971, Ser. No. 202,452
Int. Cl. C08g 51/04
U.S. Cl. 260—40 R                 10 Claims

ABSTRACT OF THE DISCLOSURE

Novaculite-filled, glass-reinforced polyethylene terephthalate compositions suitable for injection molding in standard injection molding apparatus are disclosed. The tricomponent composite can be processed without polymer or filler pretreatment and has desirable properties at room, as well as at elevated temperatures. Polyethylene terephthalate compositions filled with novaculite of selected size distribution in the absence of glass fibers is itself a distinctively useful composition.

BACKGROUND OF THE INVENTION

Thermoplastic injection molding compositions based upon polyethylene terephthalate (PET), a polycondensation product of ethylene glycol and terephthalic acid, including compositions reinforced with glass fibers, are known. A reinforcing ingredient is added to the molding compound to substantially improve the mechanical, thermal, and other properties of polymers. This invention relates to a molding composition containing a particularly advantageous filler, i.e., PET, reinforced with glass fibers and novaculite, a microcrystalline variety of low quartz, which has been classified so that the mean particle size of novaculite is approximately one-half to one-third the diameter of the glass-fiber reinforcement. The resultant injection-molded composites possess properties generally superior to unreinforced PET or to glass-reinforced PET.

This invention also relates to PET reinforced solely with novaculite of the appropriate particle size and size distribution and to processes for preparing the reinforced PET compositions referred to above.

The performance of polymeric compositions, both thermoplastic and thermosetting, in the past has been enhanced by the incorporation of fibrous reinforcement. Properties that are improved are tensile, flexural, and compressive strengths and moduli. In the case of semi-crystalline thermoplastic polymers, fibrous reinforcement gives exceptional improvements in heat distortion temperature and thermal properties. The primary factors affecting the strength of fiber-reinforced composites are properties of matrix material, properties of fibrous reinforcement, void content, interfacial adhesion, fiber aspect ratio, fiber diameter, and fiber content. Fibers used as reinforcement in most instances have aspect ratios of 50–100 or more and are ordinarily coated with appropriate coupling agents, lubricants, etc., in "finishing" or "sizing" formulations. Fibers normally used as reinforcement are of glass, asbestos, metal, carbon, boron, etc., with glass and asbestos fibers being those most frequently used.

Particulate fillers are often used to modify the properties of polymers—most notably thermosets and rubbers. Thermosetting polymers crosslink and shrink upon curing and form a strong physical bond with the particulate (and fibrous) filler. Rubbers form a chemical surface bond with the appropriate filler upon vulcanization and are often loaded up to 50% by weight with carbon black having a particle size of the order of less than 1 micron. Thermoplastic polymers are less often filled with particulate matter as large amounts of filler cause property deteriorations.

When large amounts of filler are used, e.g., from 5 to 30% by weight, the particulate filler is often pretreated or coated with one or more coupling agents, adhesion promoters, surface modifiers, intermediate boundary layers, etc., as described, for example, in U.S. Pats. 3,419,517 and 3,471,439. In addition, very small particle sizes are often specified for particulate fillers in all systems (thermoset, thermoplastic, and rubber) as it has been shown that particles larger than about 0.5 micron in diameter tend to be detrimental to the mechanical properties. Fillers larger than 0.5 micron usually increase the stiffness or modulus of a composite and severely decrease tensile and flexural strengths, impact strength, etc. The particle pretreatment specified in those patents are necessary to allow the use of high filler loadings and to allow the use of fillers whose diameter is greater than 1 micron, although pretreatment are even specified for particles smaller than 1 micron in diameter. No filler system, however, even with pretreatment, modification, etc., has been found which truly reinforces PET or which does not decrease its properties significantly.

The injection molding of glass fiber-reinforced thermoplastics, a technology to which the invention is primarily directed, has been employed in the art for a number of years. The fast cycle times, dimensional accuracy, and intricate configurations moldable make this process economically attractive. Heretofore, however, the injection molding of highly loaded particulate and fiber-filled thermoplastics in general, and PET in particular, has not been practical for many reasons. One important reason is attributable to the fact that a filler system has not been found that allows high loading in PET. Also, high filler loadings result in high shear fields and abrasive action which breaks the glass fiber-reinforcement and wears the tool and die away. Furthermore, the filler pretreatment necessary is often costly. The increase in melt viscosity caused by high loadings also makes the system unprocessable as excessively high ram pressures are necessary to completely fill the mold.

The reinforcement of polymers such as PET is even more difficult because of several characteristics of the polymer. For example, the polymer is extremely sensitive to degradation in the melt by moisture. Thus, even the low moisture (~0.1% or more) adsorbed onto most common fillers degrades PET when such fillers are melt-blended with this polymer, and the resultant polymer has an extremely low, unsatisfactory molecular weight. Fillers which have proved unsatisfactory for this reason include asbestos, kaolin, talc, and most forms of crystalline and amorphous silica. Furthermore, PET as commonly manufactured contains reactive carboxyl and hydroxyl end-groups on the polymer chain. These end-groups tend to react with many fillers, as for example, CaO, MgO, $Ca(OH)_2$, $Al(OH)_3$, $CaCO_3$ (limestone), etc., resulting in degraded or unsatisfactory mixtures. In addition, PET crystallizes readily, and while the crystalline form is desirable for many reasons, the crystallization process tends to decrease the adhesive strength of the interfacial bond between filler and polymer. Another reason is due to the fact that PET is highly viscous in the melt. Introduction of fillers increases the melt viscosity even more, and machine requirements such as ram pressure, clamp pressure, etc., become very restrictive.

SUMMARY OF THE INVENTION

I have now discovered an injection molding linear polyester formulation having a high filler content of naturally occurring fine particle size novaculite, a variety of low quartz. A particularly advantageous formulation includes a fiber reinforcement, e.g., glass fiber. Although in the specification that follows, which will be directed primarily to semicrystalline linear PET, it should be noted that the instant invention is also applicable to other linear semicrystalline polyesters as noted herinafter. Also, while it has also been common in the prior art to incorporate particulate filler materials, i.e., nonfibrous fillers, into many polymeric compositions, such particulate fillers have generally been regarded as nonreinforcing in thermoplastics and especially in PET as opposed to fibrous fillers, which are usually regarded as true reinforcing agents. This invention resides particularly in the incorporation of a naturally occurring crystalline siliceous material, crystalline novaculite, into PET which results in a true reinforced system heretofore unknown in the art. In addition, the high level of particulate fillers prescribed in the invention has heretofore not been utilized because of the adverse effect thereof on properties, processing, etc. Also, the advantageous combination of reinforcing filler and fiber allows utilization of PET of molecular weight lower than heretofore thought possible to obtain extremely strong, tough, molded products. The novaculite-filled product exhibits excellent properties such as high stiffness, low creep, good strengths, and electrical properties. These compositions are also characterized by extremely high heat distortion temperatures and good elevated temperature properties.

DESCRIPTION OF THE DRAWING

The attached figure shows the size distribution for three graded varieties of novaculite labeled A, B and C. Grade A has the broadest size distribtuion ranging from a maximum particle diameter of 44 microns to less than 1 micron. The maximum size in Grade B is 10 microns and in Grade C it is 5 microns. Common glass fibers, as indicated in the drawing, are 10-12 microns in diameter. The ordinate of this drawing does not in any way correlate with glass-fiber diameter, which is presented for convenience only.

DESCRIPTION OF THE PREFERRED EMBODIMENTS

In accordance with the invention, I have discovered that exceptionally good molded products can be obtained from composite glass fiber and novaculite-reinforced semicrystalline polyester. The semicrystalline polyesters employed in the instant invention are generally polymers having a weight average molecular weight of from about 15,000 to 80,000 as determined by dilute solution viscosity measurements. This corresponds to an intrinsic viscosity at 30° C. of 0.28 to 0.97, respectively, as measured in a 1:1 mix of tetrachloroethane/phenol. The level of crystallinity in the finished molded product ranges from about 20% up to about 60% as determined by X-ray techniques.

In addition to PET, other polyesters of similar molecular weight and degree of crystallinity can, as heretofore indicated, be utilized. The term "polyester" as used in this invention encompasses both polyesters and copolyesters that contain less than 30% of a modifying constituent or constituents, i.e., a second acid, a second diol, or both. The preferred polyesters for purposes of this invention are those obtained from ethylene glycol and terephthalic acid, i.e., PET and copolyesters thereof. The copolyester can contain more than three combined copolymerizable constituents if desired and can also involve other linkages such as amide and ether linkages. Additionally, blends of the various polyesters can be used if desired.

Any of the dibasic acids or their derivatives which are capable of forming polyesters with glycols can be utilized as components of the polyester. Suitable dibasic acids include terephthalic, isophthalic, the various naphthalene dicarboxylic (i.e., 1,5; 2,6; and 2,7), hexahydroterephthalic, bibenzoic, and substituted terephthalic, and as modifying constituents oxalic, malonic, succinic, adipic, suberic, sebacic acid, and the like.

Suitable glycols include those having the general formula $HO(CH_2)_nOH$, where $n=2-10$, and also neopentyl glycol, dimethyl cyclohexane, cyclohexane diol, and diphenols such as the various bisphenols and the naphthalene diphenols (i.e., 1,4; 1,4; 2,6; and 2,7), and the like.

The polyester preferably used in the instant invention will have a weight average molecular weight of from about 15,000 to about 90,000, preferably 18,000–80,000.

As noted above, I have found novaculite in combination with glass fibers to be uniquely advantageous as a reinforcement system for the PET. Novaculite is a naturally occurring fine-grained cryptocrystalline variety of quartz which is itself a polymorph of crystalline silica, i.e., silicon dioxide ($SiO_2$) and is not to be confused with glassy vitreous silica. Amorphous silica such as silica gel, colloided silica, fumed silica, precipitated silica, etc., is a substantially dehydrated polymerized silica often thought of as a condensation polymer of silicic acid, $Si(OH)_4$, of extremely high surface area (50–800 m.$^2$/g.). Amorphous silica also possesses a relatively high room temperature solubility in water: 100–140 p.p.m. versus 6–30 p.p.m. for quartz or crystalline silica. Amorphous silica is also extremely hygroscopic, often being used as a dessicating agent. This special character, as well as high cost, eliminates amorphous silica from consideration as a general purpose filler for polymers.

Several polymorphs of crystalline silica, or quartz, however, are often used as low-cost fillers for both thermosets and thermoplastics. The forms of $\alpha$-quartz or low quartz can be generally divided into two categories: coarsely crystalline (phanerocrystalline) quartz and fine-grained (cryptocrystalline) varieties. As the name implies, the grains of the coarse variety are clearly visible to the naked eye and may be identified by conventional methods; examples include amethyst, smoky quartz, rose quartz, citrine, aventurine, etc. Finely crystalline quartz possesses individual grains or fibers which can be seen only under high magnification. Varieties of finely crystalline quartz include carnelian, sard, prase, plasma, agate, onyx, flint, chert, chalcedony, jasper, and novaculite. Quartz and sandstone are firmly compacted rocks also in the above category. All forms of quartz are 90–99% pure $SiO_2$, and the various names are used to describe differing crystal shapes, grain sizes, and the several effects of the low percentage of included foreign elements primarily iron, titanium, aluminum oxides, and hydroxides. Surprisingly, the other forms or phases of silica and of quartz have been found to be distinctly inferior in comparison with novaculite when used as a filler for the composition which is the subject of this invention. Novaculite, an exceedingly pure (i.e., >99% $SiO_2$) microcrystalline form of $\alpha$-quartz, is found in usable quantities in and around the Devonian-Mississippian deposits of Hot Springs, Arkansas in the United States of America, and in other less extensive locations. Under the petrographic microscope, the grains of quartz are seen to possess smooth, very slightly curved surfaces. Larger particles are clusters of crystals which are easily broken down into smaller grains. This is a characteristic not found in any other form of silica. The particle shape of novaculite is also believed to be unique among all other forms of quartz. Particles are generally square or rectangular in outline, and in three-dimensional aspect might be designated as pseudo-cubic or rhombohedronic. The aspect ratio of novaculite is thus close to unity. Novaculite is closely related to chert and flint by composition, although mineralogical inspection reveals huge differences in crystalline form since fine-grained particles of chert or flint or most other forms of fine, pulverized quartz possess irregular, jagged outlines and edges with varying aspect ratios among individual crystals. See Dan's System of Mineralogy by Frondel, vol. III (1962), Wiley, New York; also see results of a study "Petrographic Analysis of Novacite®/Novaculite" published by Malvern Minerals Company, 220 Runyon Street, P.O. Box 1246, Hot Springs National Park, Arkansas. The sharp points or conchoidal fractures contribute greatly to the abrasive nature of other fillers, e.g., chert, flint, etc., but more importantly, these points are potential sources of extreme stress concentration in the finished composite material. I have found that the absence of sharp edges, corners, breaks, etc., in the filler material contributes very substantially to its use as a true reinforcement in PET rather than as a mere filler, which usually adversely affects the strength. The fact that novaculite breaks down naturally into its ultimate particle size with smooth edges and corners contributes a strong reinforcing tendency when use in PET compositions since such compositions are extraordinarily and extremely sensitive to stress concentration because of the brittle nature of crystalline PET.

It is belived that the uniquely advantageous properties of novaculite in the composition and process of the invention are due to its peculiar anhedral platelet crystalline form and nonhygroscopic characteristics, the latter probably due to the fact that the surface is believed to be packed with siloxane ($\sim$Si—O—Si$\sim$) bridges rather than silanols (SiOH) as is generally the case with most other forms of silicon dioxide. The peculiar blunt anhedral structure forms an interface with PET which does not separate even upon crystallization of the PET, which is observed under a high power microscope. Besides the contribution of this physical structure of novaculite to the interfacial integrity, the chemical nature of the novaculite surface may also be a prime reason for adhesion of PET to the untreated novaculite surface. In addition, the nonhygroscopic nature of the siloxane bridges, as compared to the highly hygroscopic pendant silanol groups ordinarily found on silica, eliminates the tendency for hydrolytic degradation of PET during melt processing. As an illustrative comparison, I have found that after 3 hr. at 125° C. several forms of quartz lost approximately 0.107% of their weight as moisture losses while novaculite loses only 0.04%. At high filler loadings, the difference in the amount of moisture present can greatly affect the degradation of PET, which is processed at approximately 280° C.

Other factors that may have an influence on the improved properties of this composition are the improved flow properties obtained in the melt during processing resulting from the peculiar blunt crystalline form and substantially invariant aspect ratio of the novaculite crystallities. The blunt rhombohedronic or pseudo-cubic form is exceeded in desirable qualities only by the spherical shape, which of course does not exist in naturally occurring materials. The aspect ratio, which is considerably close to unity, further confirms the pseudo-cubic nature of the crystallites. These two factors together facilitate processing by reducing the viscosity increase accompanying all filler addition to polymers and by decreasing the abrasiveness. The nonjagged crystals can be thought of as actually sliding over each other in shear fields such as encountered in extruders or injection molding machines. As previously stated, these factors in total may also act to improve the wetting and adhesion of the novaculite particles by the PET phase. The essential fact is that novaculite as a particulate filler provides a unique reinforcing effect which is not exceeded even by fibrous fillers when used in conjunction with PET.

The maximum particle size of the novaculite useful in the practice of the instant invention can range up to about 40 microns, but I have found it preferable to maintain the maximum diameter equivalent to or smaller than the average fiber diameter with the mean particle size approximately equal to ½ to ⅓ the fiber diameter. I have also found that, if 100% of the particles are smaller in diameter than one-half the fiber diameter, properties of the composite are reduced. Diameters of glass fibers employed are approximately 0.0004" to 0.0005" in diameter of approximately 10–12 microns, respectively. Thus, referring to the figure, I have found novaculite distribution B to be highly preferable to either A or C as will be further illustrated in the examples. While there is no minimum particle size, I have found some disadvantage in having more than 10% of the particles smaller than 1 micron diameter in distinct contrast to previously predicted behavior. The possible reasons for the low micron material C being less desirable than material B are (1) that such a small particle size material has an exceedingly high surface area which for unknown reasons is above an optimum or (2) that the particle size distribution is not broad enough. A wide distribution of particle sizes provides a composition with a small amount of voids between particles thereby requiring less polymer to fill these spaces and bind the particles together. However, this latter factor is primarily important at very high filler loadings (e.g., 70% by weight) and the experimental results indicate that composition B is superior to C even at lower filler loadings (e.g., 40% by weight). Material A, on the other hand, has a relatively broad-size distribution, but particle size appears too large for optimum reinforcement.

It is a considered likelihood that, when the mean particle diameter is one-half to one-third of the fiber diameter, optimum packing of the fiber/particle system is obtained. The examples show that I have obtained excellent properties at total filler loadings of approximately 70% and that at such loadings the packing fibers and particles is exceedingly important. The exact relationship between fiber and particle diameters is not known and the reason advanced above is not meant to be limiting, although the figures stated here have been supported experimentally.

It should be noted that all novaculite distributions (A, B and C) contain filler diameters greater than those previously expected to produce true reinforcing effects, i.e., 0.05 to 0.5 micron. Furthermore and contrary to all previously expected behavior, smaller particle diameters do not yield better composite properties than larger particles. An optimum and preferred mean particle size is approximately 4 microns having a distribution approximately as follows (curve B in drawing):

| | Particle/fiber diameter ratio |
|---|---|
| 10 microns or less 100.0% | 1.0 |
| 5 microns or less 80.0% | 0.5 |
| 3 microns or less 30.0% | 0.33 |

These figures regarding particle-size distribution should not be regarded as limiting since other ranges of distribution are also useful.

As with other forms of silica, including fibrous glass, novaculite can be treated with standard sizing agents, finishing agents, and/or organo-silanes or other coupling agents. The application of such agents to siliceous surfaces is well known to those skilled in the art. A special advantage in the use of novaculite filler is that utilization of these coupling agents is not mandatory because of the special affinity of the PET resin phase for the novaculite filler phase.

The term "glass fiber" as used herein is intended to include loose glass fibers of ⅛"–½" length, chopped roving, yarn, strands or staple, or any other forms normally used to reinforce injection-molded thermoplastics. The glass fiber may be treated with the common coupling agents, sizes, etc., as is known to those skilled in the art.

The relative proportions of the components comprising the sheets of the instant invention, i.e. of PET as the matrix, the novaculite and the glass-fiber reinforcement can vary over a broad range within the following limits. The novaculite particulate reinforcement can comprise from about 10 to about 80 weight percent of the composite, preferably about 15 to 60 weight percent. The fibrous reinforcement can comprise from about 5 to about 50 weight percent of the sheet, preferably about 10 to 45 weight percent. The polyester should comprise a minimum of about 20 weight percent of the sheet and a maximum of about 80 weight percent when fibrous reinforcement is also present. Preferably the PET will comprise 25 to 75 weight percent of the formulation. In formulations of PET and novaculite alone, the novaculite can comprise from 5 to 80% of the mixture, preferably 10 to 60% by weight.

Various processing techniques can be employed in the preparation of the injection molding composite of this invention. All three ingredients, i.e., polymer, filler, and fiber, may be fed directly to an extruder or other compound machine and extruded into pellets. These pellets can then be fed to an injection molding hopper. Or, the PET and the novaculite can be extruded into pellets which may be marketed as a commercial item; when used, it may be combined with glass fibers in the injection molding machine hopper. Or, analogously, the PET and glass fibers can be extruded and pelletized and combined with the novaculite in the injection molding machine hopper. In another variation, a highly reinforced "concentrate" can be compounded in an extruder and pelletized; this concentrate can later be "diluted" by blending with pure PET prior to injection molding. Variations of the foregoing compounding methods are of course possible.

It has been found desirable to use the technique described above in which the novaculite is first precompounded with PET, pelletized, and then blended with the glass fibers in the injection molding machine. This technique results in minimum glass fiber breakage since by first compounding the novaculite with PET, the novaculite is totally encapsulated in the polymer. Glass fiber breakage is then reduced since abrasion between the glass fibers and novaculite particles is alleviated because of the polymeric layer encapsulating the novaculite.

Processing of the composite requires only very slight modification of the usual standard thermoplastic injection molding cycle. A ram injection molding machine can be used if the material is first compounded in an extruder. The temperatures in the rear zones of extruders or injection molding machines should be higher than usual in order to achieve quick melting of the polymer and thereby reduce fiber breakage caused by the high shear fields in the viscous melt.

Example 1

A mixture of PET pellets of intrinsic viscosity (I.V.) of 0.60 and novaculite of B distribution and ⅛" long glass fibers was weighed and dry-tumbled to give a blend containing 30–40–30%, by weight of PET-novaculite-glass fibers, respectively. All material was taken as shipped by the manufacturers with no predrying or other pretreatment. The mixture was extruded, pelletized, and injection molded into test specimens. The injection molding cycle is as follows:

Barrel heating zone temperature (° F.):
    Front _____ 530
    Rear _____ 470
Nozzle temperature (° F.) _____ 540
Mold temperature (° F.) _____ 300
Injection pressure (p.s.i.) _____ 900
Holding pressure (p.s.i.) _____ 600
Total cycle time (sec.) _____ 40

Mechanical properties are presented in Table I. All tests were performed according to ASTM specifications. Note that the I.V. of the PET, as determined after molding, has been reduced to 0.4 because no special drying precautions were taken. It should be noted that, although excellent mechanical properties have been obtained in general, the I.V. of this material is significantly below the level usually considered satisfactory for molding. The tensile and flexural moduli, the heat deflection temperature, and the oxygen index are all significantly above results heretofore obtained with glass fiber-reinforced, injection-molded PET.

Example 2

PET reinforced with 30% glass fibers was injection molded under conditions equivalent to Example 1. The final I.V. was 0.4. Properties of this material are reported in Table I. The lower moduli and oxygen index, as compared to the results of Example 1 are to be noted. Furthermore, the higher water absorption is surprising since it may be expected that the material containing more siliceous material would have a higher water absorption. The material of this example consists of 70% polymer while that of Example 1 consists of only 30% polymer; this is considered significant especially when property and cost comparisons are made.

Example 3

The extending and injection molding procedure of Example 1 was repeated, except that the weight composition of PET-novaculite-glass fibers was 38–34–28, respectively. Property data are presented in Table I. Most properties, as would be expected, are similar to those of Example 1.

Example 4

The procedure of Example 3 was followed, except that after extrusion and pelletizing the material was post-polymerized up to an I.V. of 0.9. Post-polymerization was accomplished by placing the extruded pellets into a vacuum oven at 220°–230° C. for approximately 7 hrs. Shorter times would have sufficed if higher temperatures had been used. The pellets were kept dry and injection molded as previously. The I.V. of the finished specimens was 0.84. Properties are presented in Table I.

Example 5

A blend of 70% PET, 30% glass fibers was injection molded as in Example 2, except that the post-polymerization procedure of Example 4 was performed after extrusion and pelletization. Properties for this material are given in Table I. Note that with the relatively insignificant exception of impact strength, all properties of the material of Example 4 are superior to those of Example 5. The impact strength is of course lower because of the fact that all particulate filler, including novaculite, act as stress concentrators in polymeric systems. The small difference here, however, is far outweighed by the highly exceptional properties of the material of Example 4. It can safely be stated that there is no fiber-filled thermoplastic currently available with the total combination of properties of the tri-component composite of Example 4.

Example 6 (Comparative)

For purposes of comparison, ground flint quartz of mean size and size distribution equivalent to B novaculite was blended and extruded identically to the composition of Example 1. Flint quartz is the nearest akin in composition and geological history to novaculite and was chosen for this purpose. Some properties of this mixture of composition 30–40–30 PET-flintglass fibers are presented in Table I and can be compared to Example I. It is seen that this form of ground quartz is highly inferior to novaculite in this composition.

Example 7

Three compositions, as shown below, for injection molding were prepared as in Example 1 using novaculite grades A, B and C whose size distributions are given in the drawing. The composition in all cases was 50–30–20 PET-novaculite-glass fibers, respectively. Samples were injection molded and results are listed in Table II. The I.V. of the PET was determined as 0.5 in the manner previously described.

|  | Novaculite grades | | |
|---|---|---|---|
|  | C | B | A |
| Particle size (μ): | | | |
| Maximum | 5 | 10 | 44 |
| Mean | 2.7 | 4.0 | 8.5 |
| Ultimate tensile elongation (percent) | 1.1 | 1.0 | 0.64 |
| Ultimate tensile strength (p.s.i.) | 7,900 | 11,500 | 8,000 |
| Tensile modulus (p.s.i.×10⁻⁶) | 1.52 | 1.52 | 1.60 |
| Flexural strength (p.s.i.) | 17,000 | 18,000 | 14,000 |
| Flexural modulus (p.s.i.×10⁻⁶) | 1.29 | 1.29 | 1.16 |
| Shear strength (p.s.i.) | 12,000 | 12,300 | 11,150 |
| Compressive strength (p.s.i.) | 28,000 | 28,000 | 23,000 |
| Impact resistance: | | | |
| Notched Izod (ft.-lb./in.) | 0.5 | 0.5 | 0.3 |
| Broadface (ft.-lb./in.) | 0.9 | 1.1 | 0.4 |

It is readily seen that virtually all properties go through a maximum when novaculite of size distribution B is used in this composite.

Example 8

PET was blended with grades A, B and C of novaculite in the absence of glass fibers and dried at 110° C. for 1 hour. Several concentrations of each grade of filler were used. The mixtures were melt-blended in a Brabender Plasticorder mixer at approximately 280° C. for 5 to 7 minutes and then compression-molded into plaques from which specimens for testing were cut. A control sample of pure PET was also processed similarly. Some mechanical property data are indicated in Table II. Several conclusions may be reached from the results. First, grade B is seen to be preferable to grades A or C, although grade C is of a smaller average particle size. Second, when compared to the unfilled PET control, the properties of the filled PET compositions are seen to be significantly higher not only in modulus, which would ordinarily be expected, but also in strength, which is completely unexpected in a particulate-filled composite. The only significant exception is the composition filled 80% by weight with grade B novaculite in which the tensile strength is down to only 7,000 p.s.i. However, the fact that this material is filled with 70% by volume of novaculite and can still be machined into test specimens is highly significant because such a high level of filler ordinarily results in total property deterioration. Even at 60% by weight of filler, equivalent to 43.4% by volume, most thermoplastic and PET-filled compositions would be useless, but the compositions, which are the subject of this invention, are shown to be in fact truly reinforced by the novaculite filler. Grades A and C of novaculite could not be molded into test specimens at 80% loading.

Example 9

Several common mineral fillers were blended with PET, dried, and molded according to the procedure of Example 7 in varying percentages. Mechanical property data of these filled compositions are compared to several novaculite B compositions (as taken from Table II) in Table III. It should be noted that several fillers have a particle size of as low as 0.5 micron and none higher than 4 microns and yet all compositions are inferior to the novaculite-filled composites. In addition, when high filler loading was attempted, several of the compositions could not even be machined or molded into test specimens as indicated in Table III by "not moldable." Asbestos and kaolin clay, for example, could not be loaded into PET above 15% by weight. In fact, none of the common fillers of Table III can compare with grade A novaculite, which is not the preferred grade of this invention.

From Table III the difference between a true reinforcing filler and ordinary fillers is readily seen. At an equivalent filler concentration, all fillers will increase the composite modulus an equivalent amount, the exact value varying slightly with the specific gravity of the filler. For example, at 38% by weight of filler loading the flexural modulus of PET composites is approximately 0.7 to $0.9 \times 10^6$ p.s.i., while at 60% loading the modulus is 1.4 to $1.5 \times 10^6$ p.s.i. The values of flexural strength, however, are highly dependent upon the reinforcement efficiency of the filler. At 38% loading, novaculite-filled composites have flexural strengths of 11,000 p.s.i. versus approximately 7,000 p.s.i. for alumina or flint quartz-filled composite. At 60% loading, the novaculite compositions have flexural strengths of 12,500 p.s.i. versus a maximum value of 9,600 for alumina, while most other composites could not be molded at this level. No filler other than novaculite is able to be molded at 80% loading.

TABLE I

| Properties | Example | | | | | |
|---|---|---|---|---|---|---|
|  | 1 | 2 | 3 | 4 | 5 | 6 |
| Tensile: | | | | | | |
| U. E. (percent) | 0.4 | 0.9 | 0.6 | 0.9 | 1.5 | 0.3 |
| U.T.S. (p.s.i.) | 9,000 | 11,000 | 10,000 | 24,000 | 19,000 | 7,500 |
| Modulus (p.s.i.×10⁶) | 2.6 | 1.1 | 2.4 | 2.8 | 1.5 | 2.2 |
| Flexural: | | | | | | |
| Strength (p.s.i.) | 13,000 | 13,000 | 15,000 | 29,000 | 27,000 | 10,000 |
| Modulus (p.s.i.×10⁶) | 2.3 | 1.0 | 2.0 | 2.5 | 1.4 | 2.2 |
| Oxygen index (percent) | 37 | 28 | 31 | 32 | 28 |  |
| Compr. strength (p.s.i.) | 19,100 | 18,000 | 19,000 | 20,000 | 19,500 | 14,000 |
| Izod impact resistance (ft. lb./in.): | | | | | | |
| Notched | 0.6 | 0.9 | 0.6 | 1.7 | 1.8 | 0.5 |
| Unnotched | 1.8 | 3.0 | 1.5 | 6.4 | 6.7 | 1.3 |
| Density, g./cc. at 23° C | 2.04 | 1.59 | 1.95 | 1.95 | 1.59 |  |
| Water absorbtion (percent 24 hr.) | 0.035 | 0.060 | 0.04 | 0.04 | 0.06 |  |
| Coefficient linear thermal expansion (in./in./° C.×10⁻⁵) | 2.21 | 1.20 | 2.36 | 2.34 | 1.20 |  |
| Heat deflection temperature at 264 p.s.i. (° C.) | 230 | 230 | 226 | 235 | 235 |  |
| I.V. | 0.4 | 0.4 | 0.4 | 0.85 | 0.85 |  |

TABLE II

| Filler | Average particle size (μ) | Percent filler in PET composite | Tensile strength (p.s.i.) | Flexural strength (p.s.i.) | Flexural modulus (p.s.i.×10⁶) | Compr. strength (p.s.i.) |
|---|---|---|---|---|---|---|
| Novaculite: | | | | | | |
| A | 8.5 | 30 | 3,600 | 7,200 | 0.8 | 16,000 |
| A | 8.5 | 38 | 5,700 | 10,300 | 0.93 | 16,100 |
| A | 8.5 | 60 | 4,600 | 8,300 | 1.26 | 18,100 |
| B | 4.0 | 30 | 3,400 | 13,000 | 0.80 | 17,000 |
| B | 4.0 | 38 | 5,300 | 11,000 | 0.90 | 16,000 |
| B | 4.0 | 60 | 6,800 | 12,500 | 1.55 | 21,300 |
| B | 4.0 | 80 | 2,000 | 7,000 | 2.25 | 25,000 |
| C | 2.7 | 30 | 4,000 | 10,500 | 0.89 | 16,800 |
| C | 2.7 | 38 | 6,200 | 10,500 | 0.91 | 15,100 |
| C | 2.7 | 60 | 6,000 | 10,000 | 1.30 | 16,000 |
| None (PET control, I.V.=0.4) |  | 0 | 4,200 | 5,200 | 0.42 | 16,000 |

TABLE III

| Filler | Average particle size (μ) | Percent filler in PET composite | Tensile strength (p.s.i.) | Flexural strength (p.s.i.) | Flexural modulus (p.s.i.×10⁶) | Compr. strength (p.s.i.) |
|---|---|---|---|---|---|---|
| Novaculite B | 4.0 | 38 | 5,300 | 11,000 | 0.90 | 16,000 |
| Do | 4.0 | 60 | 6,800 | 12,500 | 1.55 | 21,300 |
| Do | 4.0 | 80 | 2,000 | 7,000 | 2.25 | 25,000 |
| Alumina | 0.5 | 15 | 3,600 | 6,800 | 0.62 | 16,000 |
| Do | 0.5 | 60 | 4,300 | 9,600 | 1.44 | 19,000 |
| Do | 0.5 | 80 | | Not moldable | | |
| Asbestos | | 15 | | 3,400 | 0.79 | 13,000 |
| Do | | 30 | | Not moldable | | |
| Calcium Carbonate | 2.5 | 38 | 4,200 | 7,000 | 0.63 | 14,500 |
| Do | 2.5 | 60 | | Not moldable | | |
| Kaolin | 0.5 | 15 | | Not moldable | | |
| Flint (quartz) | 4.0 | 38 | 4,400 | 7,200 | 0.89 | 16,700 |
|  | 4.0 | 60 | | Not moldable | | |
| Talc | 2.0 | 15 | | Not moldable | | |
| Treated Kaolin | 0.5 | 30 | 4,600 | 6,800 | 0.89 | 16,300 |
|  | 0.5 | 60 | | Not moldable | | |

What is claimed:

1. A reinforced, synthetic resinous composition comprising (a) from about 20 to about 95 weight percent of a thermoplastic polyester having a weight average molecular weight ranging from about 15,000 to about 90,000; and (b) from about 5 to about 80 weight percent novaculite having a maximum particle size of about 40 microns.

2. A reinforced, injection molding, synthetic resinous composition in accordance with claim 1 in which the polyester comprises from about 40 to about 90 weight percent and the novaculite comprises from about 10 to about 60 weight percent.

3. The composition of claim 2, wherein the polyester is polyethylene terephthalate.

4. The composition of claim 3 in the form of pellets suitable for use in injection molding apparatus.

5. A reinforced, synthetic resinous composition comprising (a) from about 15 to about 80 weight percent of a thermoplastic polyester having a weight average molecular weight ranging from about 15,000 up to about 90,000 and a crystallinity ranging from about 20 percent up to about 60 percent;

(b) from about 10 to about 80 weight percent novaculite having a maximum particle size of about 40 microns; and (c) from about 5 to about 50 weight percent of glass fibers.

6. A reinforced, synthetic resinous composition in accordance with claim 5, wherein the polyester comprises from about 25 to about 75 weight percent and the novaculite comprises from about 15 to about 60 weight percent and the glass fiber from about 10 to about 45 weight percent.

7. A composition in accordance with claim 5, wherein said polyester is polyethylene terephthalate.

8. The composition of claim 7 in the form of pellets suitable for use in injection molding apparatus.

9. A method of preparing a reinforced thermoplastic synthetic resinous composition comprising (a) from about 15 to about 80 weight percent of a thermoplastic polyester having a weight average molecular weight ranging from about 15,000 up to about 90,000 and a crystallinity ranging from about 20 percent up to about 60 percent;

(b) from about 10 to about 80 weight percent novaculite having a maximum particle size of about 40 microns; and (c) from about 5 to about 50 weight percent of glass fibers, comprising the steps of blending said novaculite and polyester until an intimate homogeneous dispersion of novaculite in polymer is derived and thereafter uniformly incorporating into said dispersion said glass fibers.

10. The method of claim 9 in which the intimate dispersion is subsequently fabricated into a pelleted molding composition.

References Cited

UNITED STATES PATENTS 3,516,957  6/1970  Gray et al. _____ 260—40 R

FOREIGN PATENTS 1,101,043  12/1965  Great Britain _____ 260—40 R

MORRIS LIEBMAN, Primary Examiner

S. M. PERSON, Assistant Examiner

U. S. Cl. X.R.

106—288 B